Figure 1:
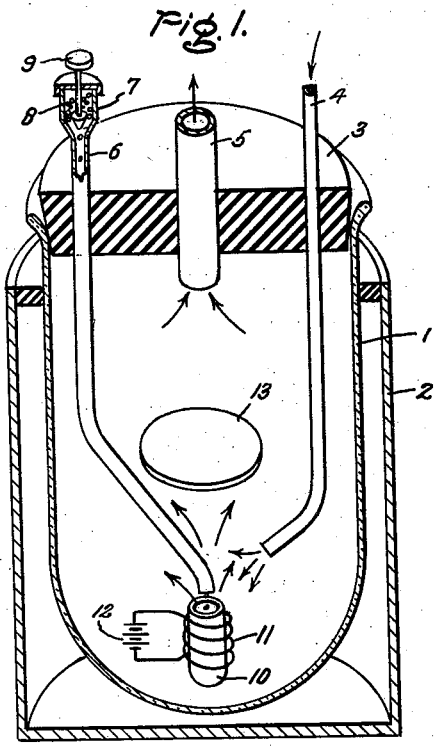

Inventor:
Dominic A. Cusano,
by Joseph V. Claeys
His Attorney.

United States Patent Office 3,108,904
Patented Oct. 29, 1963

3,108,904
METHOD OF PREPARING LUMINESCENT MATERIALS AND LUMINESCENT SCREENS PREPARED THEREBY
Dominic A. Cusano, Schenectady, N.Y., assignor to General Electric Company, a corporation of New York
Filed Aug. 30, 1960, Ser. No. 52,859
14 Claims. (Cl. 117—211)

This invention relates to the preparation of luminescent materials and in particular to the preparation of stable, transparent, electrically conductive luminescent films.

Luminescent screens formed of fine grains or particles of luminescent material have a number of deficiencies and are not ideal for many applications particularly cathode ray viewing tubes such as used in television and radar, for example.

Particle size and screen thickness limit the resolution and both local and overall contrast are reduced due to halation and light scattering effects. In addition, scattering of luminescent emission in traversing the screen thickness reduces screen brightness. It was realized, therefore, that continuous, nongrainy transparent phosphor screens would be very desirable.

Such highly desirable continuous luminescent screens of the zinc-cadmium-sulfo-selenide family of phosphors are described and claimed in U.S. Patent No. 2,685,530, D. A. Cusano et al., while continuous luminescent screens of the zinc-magnesium-fluoride famly of phosphors are described and claimed in U.S. Patent No. 2,789,062, D. A. Cusano et al. Both of the above patents are assigned to the assignee of the present invention.

Suitably prepared zinc oxide powder has certain characteristics which make it useful for various applications including luminescent screens. Some of the desirable properties of zinc oxide powder for luminescent screen applications are its high luminescent efficiency and fast luminescent rise and decay under abruptly changing excitation conditions. Luminescent screens formed from such zinc oxide powders, however, are subject to the inherent deficiencies of all powder type screens namely light scattering, halation and emission scattering effects rendering such screens not entirely satisfactory for cathode ray viewing tube applications.

While continuous nongrainy, transparent luminescent materials were recognized as being highly desirable, prior art zinc oxide continuous films were found to be either not luminescent at all or only very weakly so. In addition the electrical conductivity of such known zinc oxide films was usually small. For example, one known method of preparing zinc oxide films was by the oxidization of a vacuum evaporated metallic zinc layer. The electrical conductivity of such a layer becomes smaller the more completely the oxidization is carried out and often is immeasurably small. Since for cathode ray tube application the luminescent screen must be rendered conducting to maintain proper screen potential, it would be extremely desirable to provide a luminescent material which is conducting without application of an additional coating thereto.

It is an object of this invention, therefore, to prepare a continuous conducting luminescent zinc oxide film.

It is still another object of this invention to prepare a luminescent zinc oxide film which is electrically conducting, has fast luminescent rise and decay and low specular reflection.

Briefly stated, in accordance with one aspect of this invention, a conducting luminescent film is prepared by maintaining zinc-containing vapors and water vapors in the vicinity of a heated substrate. The zinc-containing and water vapors react at the surface of the heated substrate and the reaction product is deposited on the surface thereof in the form of a continuous film. As used throughout the specification and in the appended claims "zinc containing vapor" is intended to include, in addition to vapors of metallic zinc, the vapors of zinc compounds which upon chemical reaction with water will form zinc oxide, some examples of such compounds being the zinc halides and the zinc salts of an organic acid, as for example, zinc acetate or zinc stearate.

Figure 2:
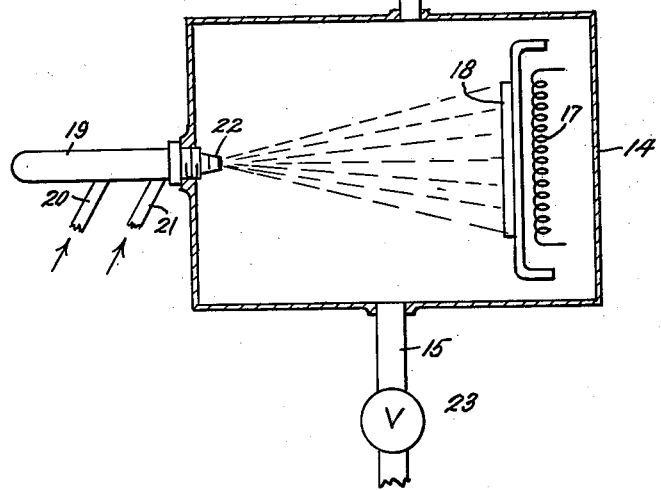

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

FIG. 1 shows partly in section an apparatus for forming the conducting luminescent films of this invention, and FIG. 2 illustrates a modified apparatus also suitable for the purposes of this invention.

The luminescent film of the present invention may be formed on any suitable substrate, such as for example, glass, quartz or anodized aluminum and preferably on a transparent substrate. The surface of the substrate may often contain impurities which are difficult to remove and which may interfere with the uniform growth of the luminescent film.

Interference with the uniform growth of the luminescent film from such surface impurities is avoided in the preferred embodiment of this invention by first applying to the surface of the selected substrate a layer of material having a crystal structure and lattice spacing which is not incompatible with the structure and lattice spacing of the luminescent film to be deposited. As used herein such a layer of material is referred to as a "nucleating surface." Suitable materials to provide such a nucleating surface, for example, are tin oxide, indium oxide or may conveniently be zinc oxide formed by the oxidization of either a vacuum evaporated metallic zinc, zinc fluoride or zinc sulfide layer. Although the thickness of the nucleating surface is not critical it is preferably of about 50 to 100 angstrom units. When a transparent substrate is utilized as in making a luminescent screen, for example, the nucleating surface layer should be likewise transparent.

This layer of zinc oxide so provided, however, is not an "active" layer, that is, it is either not luminescent at all or only very weakly so. As pointed out hereinbefore this layer serves as a nucleating surface to assure the uniform deposit of the active luminescent conducting zinc oxide film which is formed as a result of the method of the present invention.

The vacuum evaporation technique for applying such a nucleating surface layer is one now well-known in the art and will not be described in detail herein. The substrate, having the vapor deposited film of either metallic zinc, zinc fluoride or zinc sulfide, may then be heated in air or water vapor to effect the oxidization of the deposited layer to form zinc oxide. Alternatively, the oxidization of the vacum deposited layer may be effected simultaneously during the reaction of the zinc and water vapors at the surface of the heated substrate.

While use of the above described nucleating surface is preferred to assure the best and most uniform deposit of high optical quality luminescent zinc oxide on the substrate surface, satisfactory conducting luminescent zinc oxide films may be deposited directly on the substrate surface.

The apparatus for carrying out the method of preparing a conducting luminescent zinc oxide film in accordance with the present invention may be varied in structure and design, a typical arrangement being shown in FIG. 1 of the drawing. In the apparatus shown in FIG. 1 a treating chamber 1 is placed in a furnace 2 which is heated by a source not shown. Alternatively, the chamber 1 may be wrapped with resistance heating wire or other means utilized to heat it to the desired temperature. Such heating means are well-known in the art. The upper open end of chamber 1 is sealed with a stopper or plug 3 having holes therein for the passage of a supply tube 4, an evacuation tube 5 and a solid material introducing tube or conduit 6. The conduit 6 has a compartment 7 for the storage of material 8 at its upper end as well as a valve device 9 to control the flow of material down the tube. Toward the lower end of chamber 1 is located a receptacle or container 10 to receive material from conduit 6. Container 10, as well as other exposed parts, is typically of Alundum, quartz or other material which will not react with the materials used. In order that the material in container 10 may be vaporized, the latter is heated externally as by an electrical resistance wire 11. A suitable source of electrical energy for heating resistance wire 11 is shown schematically as battery 12. The plate 13 or other substrate to be coated is placed above container 10 and the lower end of tube 4.

While the above described apparatus is the preferred embodiment of that used in carrying out the present invention, the process may be practiced utilizing a modified apparatus without detracting from the quality and characteristics of the final structure produced thereby. For example, the water vapors may be produced by evaporation within the treating chamber where they rise, intermingle with the zinc-containing vapors evaporated from the material in container 10 and react therewith at the surface of the heated substrate as described hereinbefore. In FIG. 2 of the drawing there is shown still another modified apparatus in which the reacting ingredients are introduced in the vicinity of the heated substrate as a spray.

In operation the oven 2, or other heating means for chamber 1, is energized to raise the temperature of the substrate 13 sufficiently high to cause a chemical reaction between the intermingled vapors in the vicinity of its surface and less than the temperature at which dissociation of the reaction product results. Ordinarily no chemical reaction takes place between zinc-containing vapors and water vapors below 500° C. and at temperatures above 1000° C. zinc oxide sublimes and dissociates partly. The substrate, therefore, should be heated to a temperature in the range of about 550° C. to 1000° C. and preferably in the range of about 650° C. to 750° C.

The material used, which may be, for example, particles of metallic zinc or a zinc compound such as zinc chloride or a mixture thereof, is loaded into compartment 7. Container 10 is heated to a temperature at which sufficient vaporization of the substance used occurs to furnish adequate vapors for the present purpose. Ordinarily a temperature of 500° C. is sufficient. Valve 9 is opened to allow the material 8 in compartment 7 to drop by gravity into container 10 where it is evaporated and vapors thereof rise upward. At the same time water vapor is maintained in the vicinity of the substrate 13 as by introduction through tube 4. The lower end of tube 4 is so located, as shown, that the vapors rising from the material in container 10 are intermingled and mixed with the water vapors to form a gaseous dispersion in which a chemical reaction occurs at the surface of the heated substrate 13 forming a product which is condensed and deposited as a continuous, conducting, luminescent zinc oxide film on substrate 13. The chamber is evacuated through tube 5.

Since the solid materials, which upon vaporization produce zinc-containing vapors, are continuously fed into the container 10 during the reaction and an atmosphere saturated with water vapor is maintained in the chamber 1, there are always zinc-containing vapors and water vapors in the vicinity of the heated substrate 13 to enter into a chemical reaction. The zinc-containing vapors rise upward from the container 10 and react with the water vapor at the surface of the heated substrate. The reaction product is deposited on the heated surface in the form of a continuous, conducting, luminescent film which upon an electron diffraction analysis is shown to be zinc oxide having a hexagonal crystal structure. Further analysis shows a luminescent efficiency up to 10 lumens per watt and an electrical resistivity as low as 10,000 ohms per square. The growth of the film continues as long as the zinc-containing and water vapors are maintained in the vicinity of the heated substrate, films 10 microns thick being readily produced.

The water vapor may be conveniently maintained in the vicinity of the heated substrate, for example by water saturating a carrier gas and introducing this water saturated gas into the treating chamber, as through conduit 4, while evacuating the chamber through conduit 5. The carrier gas may be any gas which does not adversely effect the chemical reaction between the zinc-containing and water vapors to form zinc oxide. Some examples of suitable carrier gases are air, nitrogen, helium and the noble gases. The carrier gas selected may be bubbled through water, saturating the gas therewith, and introduced into the chamber through conduit 4.

Since the more thoroughly intermixed the zinc and water vapors are the better and more uniform is the film produced, it is often desirable to carry out the vapor reaction at reduced pressure. This reduced pressure causes a better mixture between the vapors and a better and more uniform zinc oxide film to be formed on the substrate. When using the apparatus illustrated, for example, the reaction may conveniently be carried out at pressures from atmospheric to as low as 300 microns of mercury.

It has been found that the color emission characteristics of the zinc oxide film is different when prepared using a low water content during the vapor reaction than when prepared using a high water content. For example, the conducting luminescent zinc oxide film prepared using a low water content during the vapor reaction has a luminescent emission, when excited by cathode rays, for example, which is primarily in the green, peaking at 5050 angstrom units. When prepared using a high water content, on the other hand, the emission is primarily in the ultraviolet, peaking at 3850 angrstrom units. "High water content" may be defined for purposes of this invention as being that water content in the vicinity of the heated substrate during the vapor reaction produced by introducing into the treating chamber a carrier gas maintained in the range of about 3 to 10 millimeters of mercury pressure and bubbled through water maintained at about 50° C. A "low water content" on the other hand may be defined as the water content in the vicinity of the heated substrate produced by introducing into the treating chamber the selected carrier gas maintained at a pressure in the range of about .5 to 3 millimeters of mercury and bubbled through water maintained at about room temperature.

The modified apparatus for carrying out the method of this invention, illustrated in FIG. 2, comprises an enclosure 14 of iron or other suitable material. Valved inlet and outlet conduits 15 and 16 are provided. A substrate 18 to be coated is placed within the enclosure and may be of any suitable material such as glass, quartz or anodized aluminum. A water saturated atmosphere is maintained within the enclosure and may be either at atmospheric pressure or lower if desired.

Opposite the substrate 18 is a spray 19 having inlet tubes 20 and 21 and a nozzle 22. A solution of a salt of zinc, such as zinc chloride, for example, in a suitable volatile solvent such as ethyl alcohol, is supplied by conduit 21 to the nozzle 22. A gas under pressure is supplied by the conduit 20. The gas may be air, or any other carrier gas which will not adversely effect the reaction between the zinc-containing vapors and water vapor to form zinc oxide. The gas atomizes some of the solution of zinc chloride. With the valve 23 closed, evacuation of water saturated gas through the conduit 16 maintains the desired low pressure in the enclosure. As shown hereinbefore, however, the atmosphere within the enclosure 14 may be maintained at atmospheric pressure and a satisfactory zinc oxide film having high luminescent efficiency and good electrical conductivity may be prepared.

When the spray of zinc-chloride-alcohol solution approaches or strikes the heated substrate, evaporation of the alcohol results and the zinc-containing vapors and water vapors then react at the surface of substrate 18 to form a reaction product of zinc oxide. This reaction product deposits on the surface of the heated substrate in the form of a continuous, conducting luminescent film.

In one specific example of the process in accordance with the present invention a 3 inch Pyrex glass disk was coated with a vacuum evaporated layer of zinc sulfide having a thickness of about 100 angstrom units. The coated disk was then heated in water vapor at 600° C. to oxidize and convert the zinc sulfide layer to zinc oxide, providing a transparent nucleating surface for the later deposition of the conducting luminescent zinc oxide film in accordance with this invention.

The coated disk was placed into the apparatus of FIG. 1 as illustrated and heated to a temperature of 700° C. 24 grams of predried zinc powder were introduced into compartment 7 and thence continuously into container 10 over a period of about 30 minutes, container 10 being heated to a temperature of 750° C. At the same time a carrier gas of nitrogen at a pressure of 1.5 millimeters of mercury was bubbled through water at room temperature and continuously introduced into the chamber 1 through conduit 4, the chamber being continuously evacuated through conduit 5.

After 30 minutes a 4 micron layer was formed on the surface of the glass disk which, upon analysis, was shown to be hexagonal zinc oxide having a luminescent efficiency of 10 lumens per watt, a resistivity of 10,000 ohms per square and an emission primarily in the green, peaking at 5050 angstrom units.

In another specific example of the process in accordance with the present invention, a 3 inch Pyrex glass disk was utilized as the substrate in the apparatus illustrated in FIG. 1 and heated to a temperature of 670° C. A mixture of 16 grams of predried zinc powder and 8 grams of predried zinc chloride powder were introduced into the compartment 7 and by adjustment of valve 9 continuously introduced into the container 10 over a period of approximately 30 minutes. Container 10 was maintained at a temperature of 700° C. to adequately vaporize the zinc and zinc chloride powders. At the same time a carrier gas of nitrogen at a pressure of 4 millimeters of mercury was bubbled through water maintained at 50° C. and continuously introduced into the chamber through conduit 4, the chamber being continuously evacuated through conduit 5. After approximately 30 minutes a 4 micron film was formed on the Pyrex disk which, upon analysis, was shown to be hexagonal zinc oxide having a radiant energy efficiency of 0.1 percent, an electrical resistivity of 40,000 ohms per square and an emission primarily in the ultraviolet, peaking at 3850 angstrom units.

In another specific example, a 3 inch Pyrex glass disk was placed in the apparatus of FIG. 1 and heated to a temperature of 700° C. 24 grams of predried zinc powder were introduced into compartment 7 and thence continuously into container 10 over a period of approximately 30 minutes, container 10 being heated to a temperature of about 750° to vaporize the zinc powder. At the same time a carrier gas of air at a pressure of 2.5 millimeters of mercury was bubbled through water at room temperature and continuously introduced into chamber 1 through conduit 4, the chamber being continuously evacuated through conduit 5.

After 30 minutes a 4 micron layer was formed on the surface of the glass disk which, upon analysis, was shown to be hexagonal zinc oxide having a luminescent efficiency of 10 lumens per watt, a resistivity of 10,000 ohms per square and an emission primarily in the green, peaking at 5050 angstrom units.

In yet another specific example, a 3 inch Pyrex glass disk was coated with a vacuum evaporated layer of zinc sulfide to a thickness of about 100 angstrom units. The zinc sulfide coated disk was then placed into the apparatus of FIG. 1 and heated to a temperature of 670° C. A mixture of 16 grams of predried zinc powder and 8 grams of predried zinc chloride powder were introduced into compartment 7 and thence continuously into container 10 over a period of approximately 30 minutes, container 10 being heated to a temperature of approximately 700° C. At the same time a carrier gas of air at a pressure of 2.5 millimeters of mercury was bubbled through water at room temperature and continuously introduced into chamber 1 through conduit 4 and the chamber continuously evacuated through conduit 5.

After approximately 30 minutes a 4 micron layer was formed on the surface of the glass disk which, upon analysis, was shown to be hexagonal zinc oxide having a luminescent efficiency of 10 lumens per watt, a resistivity of 10,000 ohms per square and an emission primarily in the green, peaking at 5050 angstrom units.

In all examples the conducting luminescent zinc oxide film was shown to have a luminescent emission which fell to a value of $1/e$ of its excited value in approximately 0.1 microsecond after cessation of excitation.

It will be seen that by the method of this invention there has been provided a zinc oxide luminescent material which is obtained in the form of a continuous transparent conducting film. The film is sufficiently conducting for example, that no additional conducting coating need be applied to maintain proper screen potential for cathode ray tube applications. Additional characteristics of the conducting luminescent material provided by the method of this invention are high luminescent efficiency, fast luminescent rise and decay and low specular reflection. These properties make the zinc oxide film so prepared extremely useful for a great variety of applications such as high resolution cathode ray tubes, high resolution flying spot scanning tubes, low voltage cathodoluminescent lamps, general purpose transparent conducting coatings and many others.

While only certain preferred features of the invention have been shown by way of illustration, many modifications and changes will occur to those skilled in the art. It is, therefore, to be understood that the appended claims are intended to cover all such modifications as fall within the true spirit and scope of this invention.

What I claim as new and desire to secure by Letters Patent of the United States is:

1. The method of preparing a continuous electrically conductive luminescent zinc oxide film which comprises: heating a substrate in an atmosphere saturated with water vapor to a temperature in a predetermined temperature range; introducing in the vicinity of said substrate a vaporized material which is selected from the group consisting of elemental zinc and zinc compounds which upon chemical reaction with water vapor at a temperature within said predetermined temperature range will form zinc oxide; intermingling said vaporized material with said water vapor in the vicinity of said heated substrate; and reacting said intermingled vapors at the surface of said heated substrate and depositing the reaction product on the surface thereof in the form of a continuous electrically conductive luminescent film of zinc oxide.

2. The method of claim 1 wherein the substrate is heated to a temperature in the range of about 550° C. to 1000° C.

3. The method of preparing a continuous electrically conductive luminescent zinc oxide film which comprises: providing a substrate having a nucleating surface thereon;

heating said substrate to a temperature in the range of about 550° C. to 1000° C. in an atmosphere saturated with water vapor; evaporating a material which is selected from the group consisting of elemental zinc and zinc compounds which upon chemical reaction with water vapor at a temperature within said range will form zinc oxide; intermingling water vapor with said vaporized material in the vicinity of said heated substrate; and reacting said intermingled vapors at the surface of said heated substrate to deposit the reaction product thereon in the form of a continuous electrically conductive luminescent film of zinc oxide.

4. The method of preparing a continuous electrically conductive luminescent zinc oxide film which comprises: providing a substrate having a nucleating surface thereon; heating said substrate to a temperature in the range of about 550° C. to 1000° C. in an atmosphere saturated with water vapor at reduced pressure; intermingling with said water vapor in the vicinity of said heated substrate vapors of a material selected from the group consisting of elemental zinc and a zinc compound which upon chemical reaction with water vapor within said temperature range will form zinc oxide; and reacting said intermingled vapors at the surface of said heated substrate to deposit the reaction product thereon in the form of a continuous electrically conductive luminescent film of zinc oxide.

5. The method of preparing a luminescent screen which comprises: providing a transparent substrate having a transparent nucleating surface thereon; heating said substrate to a temperature in the range of about 550° C. to 1000° C. in an atmosphere saturated with water vapor; introducing in the vicinity of said substrate vapors of a material selected from the group consisting of elemental zinc and a zinc compound which when chemically treated with water vapor at a temperature within said temperature range will form zinc oxide; intermingling said vaporized material with water vapor in the vicinity of said heated substrate at a pressure in the range of about 300 to 3000 microns of mercury; reacting said intermingled vapors at the surface of the heated substrate; and depositing the reaction product on said surface in the form of a transparent, electrically conducting luminescent film of zinc oxide.

6. The method of preparing a continuous electrically conductive luminescent zinc oxide film which comprises: providing a base; heating said base to a temperature in the range of about 550° C. to 1000° C. in an atmosphere saturated with water vapor; spraying toward said heated base a solution of a zinc compound which upon chemical reaction with water vapor at a temperature within said range will form zinc oxide in a volatile solvent to cause vapors of said zinc compound and said water vapor to react at the surface of said heated base forming zinc oxide which is deposited on the surface of said base in the form of a continuous electrically conductive luminescent film of zinc oxide.

7. The method of preparing a continuous electrically conductive luminescent zinc oxide film which comprises: heating a substrate to a temperature in the range of about 550° C. to 1000° C.; in an atmosphere saturated with water vapor; evaporating a material selected from the class consisting of zinc, and a zinc compound which upon chemical reaction with water vapors at a temperature within said range will form zinc oxide; intermingling vapors of said material with water vapor in the vicinity of said heated substrate; reacting said intermingled vapors at the surface of said heated substrate and depositing the reaction product on said surface in the form of a continuous electrically conductive luminescent film of zinc oxide.

8. The method of preparing a continuous electrically conductive luminescent zinc oxide film which comprises: heating a substrate having a coating of zinc sulfide thereon to a temperature in the range of about 550° C. to 1000° C.; intermingling of a material selected from the group consisting of elemental zinc and a zinc compound which upon chemical reaction with water vapor at a temperature within said temperature range will form zinc oxide vapors with water vapor in the vicinity of said heated substrate; reacting said intermingled vapors at the surface of said heated substrate; and depositing the reaction product on said surface in the form of a continuous electrically conductive luminescent film.

9. The method of preparing a continuous electrically conductive luminescent zinc oxide film which comprises: coating a substrate with a material selected from the class consisting of zinc, zinc fluoride and zinc sulfide to a thickness of about 50 to 100 angstrom units; oxidizing said coating to form a nucleating surface of zinc oxide; heating said coated substrate to a temperature in the range of about 550° C. to 1000° C.; intermingling vapors of a material selected from the group consisting of elemental zinc and a zinc compound which upon chemical reaction with water vapor at a temperature within said range will form zinc oxide with water vapor in the vicinity of said heated substrate; and reacting said intermingled vapors at the surface of said heated substrate to deposit the reaction product on said surface in the form of a continuous, electrically conducting luminescent film.

10. A luminescent screen for cathode rays comprising: a base of transparent material having a melting point above 550° C.; a transparent nucleating surface film deposited on said base; and a transparent, electrically conducting luminescent zinc oxide film deposited upon said nucleating surface film.

11. The luminescent screen of claim 10 wherein the base is glass and the nucleating surface is a film of non-luminescent zinc oxide.

12. A luminescent screen comprising: a base of transparent material having a melting point above 550° C.; a transparent nucleating surface film deposited on the surface of said base; and a transparent electrically conductive luminescent zinc oxide film deposited upon said nucleating surface, said zinc oxide film having a resistance as low as 10,000 ohms per square.

13. A luminescent screen comprising: a base of transparent material having a melting point above 550° C; and a transparent electrically conducting luminescent zinc oxide film deposited thereon, said film exhibiting a luminescent efficiency of at least 10 lumens per watt and a resistance as low at 10,000 ohms per square.

14. A luminescent screen comprising: a transparent material having a melting point above 550° C.; a transparent nucleating surface film deposited thereon; and a transparent electrically conducting luminescent zinc oxide film deposited upon said nucleating surface film, said zinc oxide film exhibiting a luminescent efficiency of at least 10 lumens per watt, a resistance as low as 10,000 ohms per square and a luminescent emission which falls to a value $1/e$ of its excited value in approximately 0.1 microsecond after cessation of excitation.

References Cited in the file of this patent

UNITED STATES PATENTS 2,791,521    Jaffe    May 7, 1957

FOREIGN PATENTS 732,566    Great Britain    June 29, 1955
552,958    Canada    Feb. 11, 1958